March 1, 1966 R. MEINL ETAL 3,238,295
TELEVISION CAMERA WITH VIDICON-TYPE TUBE
Filed Oct. 23, 1964
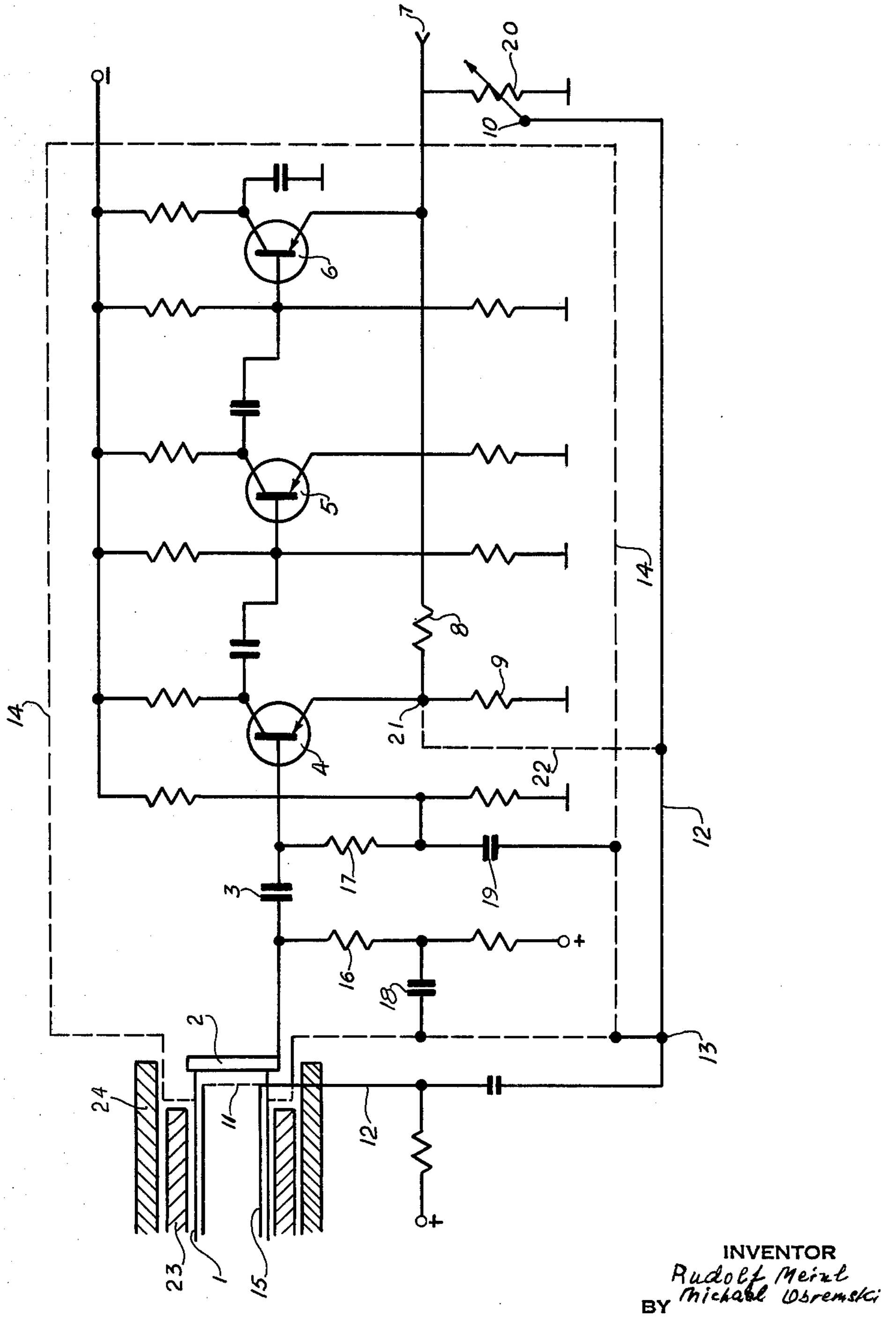
INVENTOR
Rudolf Meinl
BY Michael Obremski
Michael J. Striker
ATTORNEY United States Patent Office 3,238,295

Patented Mar. 1, 1966

3,238,295
TELEVISION CAMERA WITH VIDICON-TYPE TUBE

Rudolf Meinl and Michael Obremski, Furth, Germany, assignors to Grundig Elektro-Mechanische Versuchsanstalt, Furth, Germany Filed Oct. 23, 1964, Ser. No. 406,108
Claims priority, application Germany, Jan. 14, 1964, G 39,602
14 Claims. (Cl. 178—7.2)

The present invention relates to a television camera having a vidicon-type picture tube, i.e., a small camera tube containing an electron gun and a photoconductor on which an optical image is focussed so that a beam of electrons from the gun is collected by the photoconductor and transformed into current whose rapid fluctuations representing the light and shade of the image are subsequently amplified and transmitted as television picture signals.

A vidicon tube conventionally incorporates a fine-mesh electrode which is arranged directly ahead of the signal electrode, this mesh electrode serving to produce a homogeneous decelerating field and also as an ion collector. In operation, this mesh electrode has applied to it a direct current potential of the order of several hundred volts, with respect to the cathode potential. The mesh eletcrode is connected to ground potential insofar as alternating current is concerned by means of a capacitor of suitable capacitance. Thus, the signal electrode and the mesh electrode form a capacitance. This capacitance, which is enlarged still further by the ground conductors and shielding, positioned in the immediate vicinity of the signal electrode of the vidicon tube, as well as by the components arranged between the signal electrode and these ground conductors, has an adverse effect on the input circuit of the amplifier in that the signal-to-noise ratio is inversely proportional to the amplifier input capacitance.

If the amplifier is a transistorized amplifier, the preamplifier unit can be fashioned as a ring-shaped printed circuit and be arranged about the signal electrode of the vidicon tube. This not only makes efficient use of the available space, but also, the undesired input capacitance is decreased inasmuch as the leads, which inherently constitute parasitic capacitances, are shortened. However, experience has shown that quite substantial input capacitances will still remain, and this has been found to present difficulties if, for example as the result of poor lighting, the input signal is very small.

In the case of the iconoscope, attempts have been made to improve the quality of the image signal by making the external resistor to which the signal electrode is connected very high, i.e., to provide a high-ohmic external resistor. However, such a high-ohmic resistor forms together with the relatively high input capacitances an RC-element having a large time constant, so that high frequencies are greatly attenuated. In order to compensate for this at least to a certain extent, a conductive ring may be mounted on the outside of the iconoscope envelope, at the level of the signal electrode, this ring being connected with the first amplifier stage, the same operating as a cathode follower. Since in the case of cathode followers the potential at the cathode and grid fluctuate in the same direction, the result is that the potential of the external ring connected to the cathode fluctuates in the same direction as the potential of the signal electrode, the latter being connected to the grid. In this way, the harmful capacitance of the signal electrode is compensated to such an extent that the time constant is reduced and the frequency characteristic improved. It also improves the signal-to-noise ratio. However, there remains the drawback that, since in the case of cathode followers the voltage amplification was always smaller than 1, the compensation is nevertheless still incomplete. Furthermore, the stray capacitance between the anode and the signal electrode as well as the circuit capacitances of the amplifier input still remains uncompensated, so that there still remains a parasitic capacitance of the order of several picofarads (pf.).

It is also known that the input of the amplifier, which is to a large extent responsible for the signal-to-noise ratio, has to be shielded. One type of amplifier, used for other purposes and connected in common-collector configuration, has the shielding connected to the emitter of the second transistor. The collector as well as the base point of the base resistance are connected to the same potential insofar as alternating current is concerned. As a result, the stray capacitance of the input stage as well as the collector-to-base capacitance of the input transistor are reduced, so that the base resistance of this transistor can no longer act as a shunt connection. But this circuit, too, fails to compensate for all of the above-mentioned capacitances.

It is, therefore, the object of the present invention to provide a circuit arrangement which overcomes the above drawbacks, and, with this object in view, the present invention resides in the provision of a television camera having a vidicon tube in which the signal-to-noise ratio, caused essentially by the above-mentioned harmful capacitances, is brought to an optimum irrespective of the type of amplifier. According to the present invention, this is brought about by providing means which connect, with respect to A.C., a point of the amplifier with the anode and/or mesh electrode in such a manner as to apply to the anode and/or mesh electrode a compensating potential which is in phase with the signal electrode, the amplitude of which compensating potential is just short of causing self-excitation of the amplifier. The amplifier may, in practice, be compact, i.e., miniaturized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which the single figure is a circuit diagram of the present invention.

Referring now to the drawing, the same shows a vidicon tube 1 having a signal electrode 2 which is connected, via a coupling capacitor 3, with the base of the input transistor 4, which is connected in common-emitter configuration, as is the next transistor 5. The amplified video signal is taken off at the output terminal 7. A feedback voltage is derived from a third transistor 6, connected in common-collector configuration, this feedback voltage thus acting over three stages, so that the over-all amplification achieved by the three stages 4, 5, 6, is determined by the ratio of the feedback resistor 8 to the emitter resistor 9 of the first stage. The amplifier can be miniaturized, e.g., as a printed circuit and be arranged annularly about the signal electrode of the vidicon.

The output signal appears at point 10 in the emitter circuit of the last transistor 6, at the correct phase and amplitude, so that this point 10 can serve as the base point for the compensating voltage which is fed back. The amplitude of this compensating voltage should be as high as possible in order to adequately compensate for the harmful capacitances. The amplitude must, however, be made only so large as to be just short of causing self-excitation of the amplifier. The phase of the compensating voltage should coincide as nearly as possible with the phase of the signal voltage at the input of the amplifier. The compensating voltage is applied, via a line 12, to the mesh electrode 11 and the anode 15 of the vidicon tube, thereby eliminating the capacitance between the signal electrode 2, the mesh electrode 11, and the anode 15.

The shielding 14, for at least the first amplifier stage and preferably the entire amplifier, is connected, at 13, to the compensating potential, so that this capacitance, too, is eliminated. The resistors 16 and 17 are likewise connected, via capacitors 18 and 19, respectively, to the shielding 14 which itself is, as described above, connected to the compensating voltage. In this way, the A.C. input resistance for high signal frequencies is substantially increased, thereby improving the signal-to-noise ratio.

It has been found expedient to connect the shielding of the deflection coils 23, as well as that of the focussing coils 24, to the compensating potential.

The compensating voltage can be taken off, adjustably, from a potentiometer 20 which itself is connected directly to the base point 10, or from a tap of the feedback resistor 8. If the adjustability of the compensating voltage can be dispensed with, this voltage can be taken off from the juncture 21 of the resistors 8 and 9, as shown by the connection 22.

If the input circuit is constituted by one or more emitter followers connected in cascade, the collector of the first stage is best connected, insofar as A.C. is concerned, to the line carrying the compensating voltage.

It will be understood that each of the elements described above, or two or more together, may also find a useful application in other types of circuits differing from the types described above.

While the invention has been illustrated and described as embodied in a vidicon tube circuit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a television camera, the combination which comprises: a vidicon tube having a signal electrode and at least one further electrode arranged near said signal electrode; an amplifier connected to said signal electrode; and means connecting a point of said amplifier with said further electrode for applying to the latter a compensating potential which is in phase with the potential of said signal electrode, the amplitude of which compensating potential is just short of causing self-excitation of said amplifier.

2. The combination defined in claim 1 wherein said further electrode is a mesh electrode.

3. The combination defined in claim 1 wherein said further electrode is an anode.

4. In a television camera, the combination which comprises: a vidicon tube having a signal electrode and electrode means arranged near said signal electrode; an amplifier connected to said signal electrode; and means connecting, with respect to A.C., a point of said amplifier with said electrode means for applying to the latter a compensating potential which is in phase with the potential of said signal electrode, the amplitude of which compensating potential is just short of causing self-excitation of said amplifier.

5. The combination defined in claim 4 wherein said amplifier is miniaturized.

6. In a television camera, the combination which comprises: a vidicon tube having a signal electrode and electrode means arranged near said signal electrode, said further electrode means including a mesh electrode and an anode electrode; an amplifier connected to said signal electrode; and means connecting, with respect to A.C., a point of said amplifier with said mesh and anode electrodes for applying thereto a compensating potential which is in phase with the potential of said signal electrode, the amplitude of which compensating potential is just short of causing self-excitation of said amplifier.

7. In a television camera, the combination which comprises: a vidicon tube having a signal electrode and further electrode means arranged near said signal electrode; an amplifier connected to said signal electrode; means connecting a point of said amplifier with said electrode means for applying to the latter a compensating potential which is in phase with the potential of said signal electrode, the amplitude of which compensating potential is just short of causing self-excitation of said amplifier; and shielding means associated with said signal electrode and at least part of said amplifier, said shielding means being connected to said point of said amplifier.

8. In a television camera, the combination which comprises: a vidicon tube having a signal electrode and electrode means arranged near said signal electrode; a multiple-stage amplifier connected to said signal electrode; means connecting a point of said amplifier with said electrode means for applying to the latter a compensating potential which is in phase with the potential of said signal electrode, the amplitude of which compensating potential is just short of causing self-excitation of said amplifier; and shielding means for shielding said signal electrode and at least the first stage of said amplifier, said shielding means being connected to said point of said amplifier.

9. The combination defined in claim 8 wherein said vidicon tube has coil means associated with it and wherein said shielding means also shield said coil means.

10. The combination defined in claim 9 wherein said coil means include a deflection coil.

11. The combination defined in claim 9 wherein said coil means include a focussing coil.

12. In a television camera, the combination which comprises: a vidicon tube having a signal electrode and electrode means arranged near said signal electrode; a multiple-stage transistorized amplifier connected to said signal electrode, the last stage of said amplifier being connected in common-collector configuration; and means connecting, with respect to A.C., a point of said amplifier with said electrode means for applying to the latter a compensating potential which is in phase with the potential of said signal electrode, the amplitude of which compensating potential is just short of causing self-excitation of said amplifier, said point being in the emitter circuit of said last stage of said amplifier.

13. The combination defined in claim 12 wherein said connecting means comprise a potentiometer connected to said point for enabling said compensating potential to be adjusted.

14. The combination defined in claim 12 wherein said amplifier has a feedback resistor wherein the first stage of said amplifier is connected in common-emitter configuration and includes an emitter resistor connected to said feedback resistor, and wherein said point of said amplifier is the juncture of said two resistors.

No references is cited.

DAVID G. REDINBAUGH, *Primary Examiner.*

J. McHUGH, *Assistant Examiner.*